(12) United States Patent
Korenaga

(10) Patent No.: US 11,410,469 B2
(45) Date of Patent: Aug. 9, 2022

(54) VEHICLE-MOUNTED DEVICE, WAITING TIME MANAGEMENT METHOD, AND WAITING TIME MANAGEMENT PROGRAM

(71) Applicant: MITSUBISHI HEAVY INDUSTRIES MACHINERY SYSTEMS, LTD., Kobe (JP)

(72) Inventor: Takeshi Korenaga, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 111 days.

(21) Appl. No.: 16/957,484

(22) PCT Filed: Dec. 27, 2017

(86) PCT No.: PCT/JP2017/046941
§ 371 (c)(1),
(2) Date: Jun. 24, 2020

(87) PCT Pub. No.: WO2019/130478
PCT Pub. Date: Jul. 4, 2019

(65) Prior Publication Data
US 2021/0074086 A1 Mar. 11, 2021

(51) Int. Cl.
*G07B 15/02* (2011.01)
*B60W 20/40* (2016.01)
(Continued)

(52) U.S. Cl.
CPC .............. *G07B 15/02* (2013.01); *B60L 1/006* (2013.01); *B60L 58/10* (2019.02); *B60W 20/40* (2013.01);
(Continued)

(58) Field of Classification Search
CPC ........ G07B 15/02; G07B 15/06; G07B 15/00; G07C 5/02; G07C 5/04; G07C 5/0841;
(Continued)

(56) References Cited

U.S. PATENT DOCUMENTS 5,694,322 A * 12/1997 Westerlage ............ G01C 21/26
340/870.07
5,721,678 A * 2/1998 Widl ...................... G01C 21/26
705/417
(Continued)

FOREIGN PATENT DOCUMENTS

JP      2007-112405 A      5/2007
JP      2009043160 A *      2/2009 ............. G07B 15/00
(Continued)

OTHER PUBLICATIONS

PCT/ISA/210, "International Search Report for International Application No. PCT/JP2017/046941," dated Apr. 3, 2018.
(Continued)

*Primary Examiner* — Dale W Hilgendorf
(74) *Attorney, Agent, or Firm* — Kanesaka Berner and Partners LLP

(57) ABSTRACT

A vehicle-mounted device includes a waiting time determination unit which determines a waiting time until the vehicle-mounted device transitions from a power-on state where a service providing function is performed to a power saving state where the service providing function is stopped while an engine of a vehicle is stopped, and a state transition unit which shifts the vehicle-mounted device from the power-on state to the power saving state after the waiting time has elapsed since stopping of an engine of the vehicle, and the waiting time determination unit changes the waiting time from a waiting time at a time of previous engine stopping.

11 Claims, 10 Drawing Sheets

(51) Int. Cl.
*G07C 5/04* (2006.01)
*G07C 5/08* (2006.01)
*G08G 1/133* (2006.01)
*B60L 1/00* (2006.01)
*B60L 58/10* (2019.01)
*G07C 5/02* (2006.01)
*G07B 15/00* (2011.01)
*G07B 15/06* (2011.01)

(52) U.S. Cl.
CPC ............ *G07B 15/00* (2013.01); *G07B 15/06* (2013.01); *G07C 5/02* (2013.01); *G07C 5/04* (2013.01); *G07C 5/0841* (2013.01); *G08G 1/133* (2013.01)

(58) Field of Classification Search
CPC ......... B60L 1/006; B60L 58/10; B60W 20/40; G08G 1/133
See application file for complete search history.

(56) References Cited

U.S. PATENT DOCUMENTS

| | | | | |
|---|---|---|---|---|
| 6,123,642 | A * | 9/2000 | Saito | F16H 61/0403 477/3 |
| 6,211,681 | B1 * | 4/2001 | Kagawa | B60L 3/0046 324/426 |
| 10,328,944 | B2 * | 6/2019 | Dudar | B60W 10/30 |
| 2003/0189498 | A1 * | 10/2003 | Kakihara | G06Q 30/0284 340/928 |
| 2005/0086100 | A1 * | 4/2005 | Yanagisawa | G07B 15/02 705/13 |
| 2012/0253892 | A1 * | 10/2012 | Davidson | G06Q 10/0631 705/7.42 |
| 2016/0210851 | A1 | 7/2016 | Oshima et al. | |
| 2018/0301034 | A1 * | 10/2018 | Morita | G01C 21/3602 |
| 2020/0349780 | A1 * | 11/2020 | Nakamoto | G07C 5/0841 |

FOREIGN PATENT DOCUMENTS

| | | |
|---|---|---|
| JP | 2010-204756 A | 9/2010 |
| JP | 2015-049629 A | 3/2015 |
| JP | 2016-222105 A | 12/2016 |

OTHER PUBLICATIONS

PCT/ISA/237, "Written Opinion of the International Searching Authority for International Application No. PCT/JP2017/046941," dated Apr. 3, 2018.

* cited by examiner

FIG. 9

| CHARGING AREA | CHARGING START TIME | CHARGING TERMINATION TIME | DETERMINATION INFORMATION | | | | |
|---|---|---|---|---|---|---|---|
| A1 | 07:00:00 | 18:00:00 | ... | ... | ... | ... | ... |
| A2 | 12:00:00 | 15:00:00 | ... | ... | ... | ... | ... |
| ... | ... | ... | ... | ... | ... | ... | ... |

# VEHICLE-MOUNTED DEVICE, WAITING TIME MANAGEMENT METHOD, AND WAITING TIME MANAGEMENT PROGRAM

TECHNICAL FIELD

The present invention relates to a vehicle-mounted device, a waiting time management method, and a waiting time management program.

BACKGROUND ART

As vehicle-mounted devices mounted in vehicles, vehicle-mounted devices providing various services are known. For example, Patent Literature 1 discloses a vehicle-mounted device that specifies the position of a vehicle and has a billing function of performing billing in a case where a vehicle is present in a billing area. In addition, for example, a vehicle-mounted device having a driving evaluation function for evaluating whether or not a driver is appropriately driving a vehicle, such as whether a driver is driving roughly or a vehicle is traveling on an inappropriate route, is also known. For example, Patent Literature 2 discloses a vehicle-mounted device that transmits positional information, a speed, an acceleration, an angular velocity, and the like, which are traveling information of a vehicle, to a driving management device to evaluate a driver's driving of the vehicle.

As described above, in a vehicle-mounted device providing various services, power is supplied from a battery of a vehicle. For this reason, in order to prevent the exhaustion of a remaining amount of charge of the battery, the vehicle-mounted device is configured to transition from a power-on state to a power saving state (including a power-off state) where a service providing function is stopped after an engine of the vehicle is stopped. In general, such transition is not performed immediately after an engine of a vehicle is stopped, and a waiting time until transition is started is set.

The reason for setting the waiting time is, for example, to secure a processing time because the vehicle-mounted device needs to perform certain processing such as recording of a log before stopping the service providing function. In addition, it is necessary to enable the service providing function immediately after the engine is started up for some services provided by the vehicle-mounted device, and thus maintaining a power-on state for a waiting time in case the engine is immediately started up after being stopped is also an aim.

CITATION LIST

Patent Literature

[Patent Literature 1]
Japanese Unexamined Patent Application, First Publication No. 2010-204756
[Patent Literature 2]
Japanese Unexamined Patent Application, First Publication No. 2015-49629

SUMMARY OF INVENTION

Technical Problem

However, in a vehicle-mounted device of the related art, a waiting time is fixed, and thus there is a possibility that a user will be able to ascertain the length of the waiting time through the trial and error of repeatedly stopping and starting an engine within a short period of time. For this reason, the user of the vehicle can intentionally stop the engine of the vehicle and start the engine after waiting until the waiting time elapses to disable a service providing function of the vehicle-mounted device, which may result in the misuse of engine stopping. Accordingly, in order to prevent the misuse of engine stopping by a user of a vehicle, there have been demands for a technique for changing a waiting time until transition to a power saving state where a service providing function is stopped while the engine of the vehicle is stopped.

In view of the above-described problem, the present invention provides a vehicle-mounted device, a waiting time management method, and a waiting time management program which are capable of changing a waiting time until transition to a power saving state where a service providing function is stopped while the engine of a vehicle is stopped and preventing misuse by a user of the vehicle.

Solution to Problem

According to a first aspect of the present invention, a vehicle-mounted device (10) includes a waiting time determination unit (12) which is configured to determine a waiting time until the vehicle-mounted device transitions from a power-on state where a service providing function is performed to a power saving state where the service providing function is stopped while an engine of a vehicle (1) is stopped, and a state transition unit (13) which is configured to shift the vehicle-mounted device from the power-on state to the power saving state after the waiting time has elapsed since stopping of the engine of the vehicle, in which the waiting time determination unit is configured to change the waiting time from a waiting time when the engine was previously stopped.

In this manner, the vehicle-mounted device can change the waiting time from the waiting time when the engine was previously stopped. Accordingly, it is difficult for a user of the vehicle to ascertain the length of the waiting time, and thus it is possible to prevent the misuse of engine stopping.

In addition, according to a second aspect of the present invention, in the vehicle-mounted device (10) according to the first aspect of the present invention, the waiting time determination unit (12) is configured to randomly determine the waiting time.

In this manner, the waiting time is irregularly changed, and it becomes more difficult for the user of the vehicle to ascertain the length of a waiting time. Accordingly, it is possible to more effectively prevent the user of the vehicle from misusing engine stopping.

In addition, according to a third aspect of the present invention, the vehicle-mounted device (10) according to the first or second aspect of the present invention further includes a determination information acquisition unit (15) which is configured to acquire determination information regarding the vehicle (1) of which the engine has been stopped, and the waiting time determination unit (12) is configured to determine the waiting time on the basis of the determination information.

In this manner, the waiting time is determined on the basis of determination information regarding the vehicle of which the engine has been stopped, and thus it is possible to more accurately determine whether or not the user of the vehicle has performed an operation for attempting to misuse engine stopping of the vehicle from the determination information and change the waiting time in a case where there is a strong possibility that the user of the vehicle has performed such an operation.

In addition, according to a fourth aspect of the present invention, in the vehicle-mounted device (10) according to the third aspect of the present invention, the determination information includes information of the number of restarts of the engine of the vehicle (1) within a predetermined determination time, and the waiting time determination unit (12) is configured to determine the waiting time to become longer than the waiting time when the engine was previously stopped in a case where the number of restarts is equal to or greater than a predetermined number of times of determination.

In this manner, it is possible to prevent the misuse of engine stopping by increasing a waiting time for a user who intends to misuse engine stopping by frequently performing engine stopping or engine starting.

In addition, according to a fifth aspect of the present invention, in the vehicle-mounted device (10) according to the fourth aspect of the present invention, the waiting time determination unit (12) is configured to return the waiting time to a waiting time before a change to the determined waiting time after a predetermined application time has elapsed since the change.

In this manner, it is possible to appropriately apply the change of a waiting time for only a predetermined application time requiring a countermeasure for preventing misuse and to more effectively prevent a user of the vehicle from misusing engine stopping.

In addition, according to a sixth aspect of the present invention, in the vehicle-mounted device (10) according to the fourth aspect of the present invention, the waiting time determination unit (12) is configured to return the waiting time to a waiting time before a change to the determined waiting time after a transition from the power-on state to the power saving state has been performed a predetermined number of times of application after the change.

In this manner, it is possible to appropriately apply the change of a waiting time a predetermined number of times of application requiring a countermeasure for preventing misuse and to more effectively prevent a user of the vehicle from misusing engine stopping.

In addition, according to a seventh aspect of the present invention, in the vehicle-mounted device (10) according to the third aspect of the present invention, the determination information includes information of a predetermined position, and the waiting time determination unit (12) is configured to determine the waiting time to become longer than the waiting time when the engine was previously stopped in a case where a current position of the vehicle (1) is the predetermined position.

In this manner, it is possible to apply the change of a waiting time in a case where the current position of the vehicle is a predetermined position requiring a countermeasure for preventing misuse and to effectively prevent a user of the vehicle from misusing engine stopping.

In addition, according to an eighth aspect of the present invention, in the vehicle-mounted device (10) according to the third aspect of the present invention, the determination information includes information of a predetermined time slot, and the waiting time determination unit (12) is configured to determine the waiting time to become longer than the waiting time when the engine was previously stopped in a case where a current included in the predetermined time slot.

In this manner, it is possible to apply the change of a waiting time in a case where the current time is included in the predetermined time slot requiring a countermeasure for preventing misuse and to more effectively prevent a user of the vehicle from misusing engine stopping.

In addition, according to a ninth aspect of the present invention, in the vehicle-mounted device (10) according to the third aspect of the present invention, the determination information includes information of an acceleration and an angular velocity of the vehicle, and the waiting time determination unit (12) is configured to determine the waiting time so that the waiting time does not elapse until a condition that the acceleration and the angular velocity are continuously equal to or less than predetermined threshold values for a predetermined period of time is satisfied.

In this manner, it is possible to apply the change of a waiting time until an acceleration and an angular velocity of the vehicle satisfy a predetermined condition indicating a situation where a countermeasure for preventing misuse is not necessary and to more effectively prevent a user of the vehicle from misusing engine stopping.

In addition, according to a tenth aspect of the present invention, a waiting time management method includes a waiting time determination step of determining a waiting time until the vehicle-mounted device transitions from a power-on state where a service providing function is performed to a power saving state where the service providing function is stopped while an engine of a vehicle is stopped, and a state shifting step of shifting the vehicle-mounted device from the power-on state to the power saving state after the waiting time has elapsed since stopping of the engine of the vehicle, in which the waiting time determination step includes changing the waiting time from a waiting time when the engine was previously stopped.

In addition, according to an eleventh aspect of the present invention, in a waiting time management program causing a computer of a vehicle-mounted device to function as a waiting time determination unit which is configured to determine a waiting time until the vehicle-mounted device transitions from a power-on state where a service providing function is performed to a power saving state where the service providing function is stopped while an engine of a vehicle is stopped, and a state transition unit which is configured to shift the vehicle-mounted device from the power-on state to the power saving state after the waiting time has elapsed since stopping of the engine of the vehicle, the waiting time determination unit is configured to change the waiting time from a waiting time when the engine was previously stopped.

Advantageous Effects of Invention

According to the above-described vehicle-mounted device, waiting time management method, and waiting time management program, it is possible to change a waiting time until transition to a power saving state where a service providing function is stopped while the engine of a vehicle is stopped, and it is difficult for a user U of the vehicle to ascertain the length of a waiting time, so that it is possible to prevent misuse by the user of the vehicle.

BRIEF DESCRIPTION OF DRAWINGS

FIG. 9 is a second diagram showing an example of determination information according to the first modification example of the second embodiment.

DESCRIPTION OF EMBODIMENTS

First Embodiment

Figure 1:
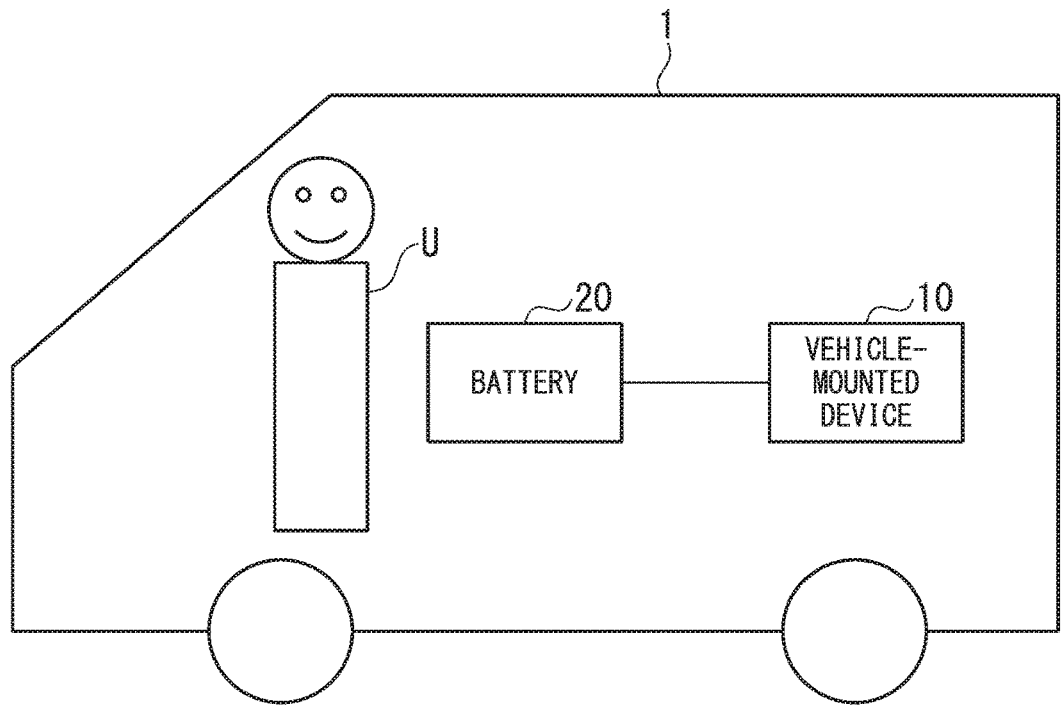
FIG. 1 is a schematic diagram showing an overall configuration of a vehicle including a vehicle-mounted device according to a first embodiment.

Hereinafter, a first embodiment will be described with reference to the drawings. The same or equivalent components in all of the drawings will be denoted by the same reference numerals and signs, and repeated description thereof will be omitted.

(Overall Configuration of Vehicle Including Vehicle-Mounted Device According to First Embodiments)

FIG. 1 is a schematic diagram showing an overall configuration of a vehicle 1 including a vehicle-mounted device 10 according to a first embodiment. An overall configuration of the vehicle 1 including the vehicle-mounted device 10 according to the first embodiment will be described using FIG. 1.

As shown in FIG. 1, the vehicle 1 includes a vehicle-mounted device 10 providing a service to a user U using the vehicle 1, and a battery 20. In the first embodiment, a case where the vehicle 1 is a four-wheeled vehicle will be described, but the vehicle 1 may be a two-wheeled vehicle such as a motorcycle, a three-wheeled vehicle, or a multi-wheeled vehicle having five or more wheels. Further, in the first embodiment, a case where the user U is a driver of the vehicle 1 will be described, but the user U may be a user other than a driver, for example, an occupant who does not drive the vehicle 1.

The vehicle-mounted device 10 is mounted in the vehicle 1 and is configured to be able to provide a service to the user U of the vehicle 1. In the first embodiment, a case where the vehicle-mounted device 10 is onboard unit having a billing function for performing billing processing, such as a toll on a toll road, for the vehicle 1 which is positioned in a predetermined billing area will be described. However, the vehicle-mounted device 10 may be a driving evaluation device having a driving evaluation function for evaluating whether or not the driver is appropriately driving the vehicle 1 with respect to items such as whether or not the driver of the vehicle 1 is driving on a determined route, whether or not the vehicle is traveling at a specified speed, and whether or not the vehicle is traveling at a specified time, or may be any of other devices having a service providing function.

The battery 20 is mounted in the vehicle 1 and is connected to an engine peripheral device (not shown) and the like of the vehicle 1 and the vehicle-mounted device 10. The battery 20 is configured to supply power to the engine peripheral device and the like of the vehicle 1 and supply power to the vehicle-mounted device 10.

(Functional Configuration of Vehicle-Mounted Device According to First Embodiment)

Figure 2:
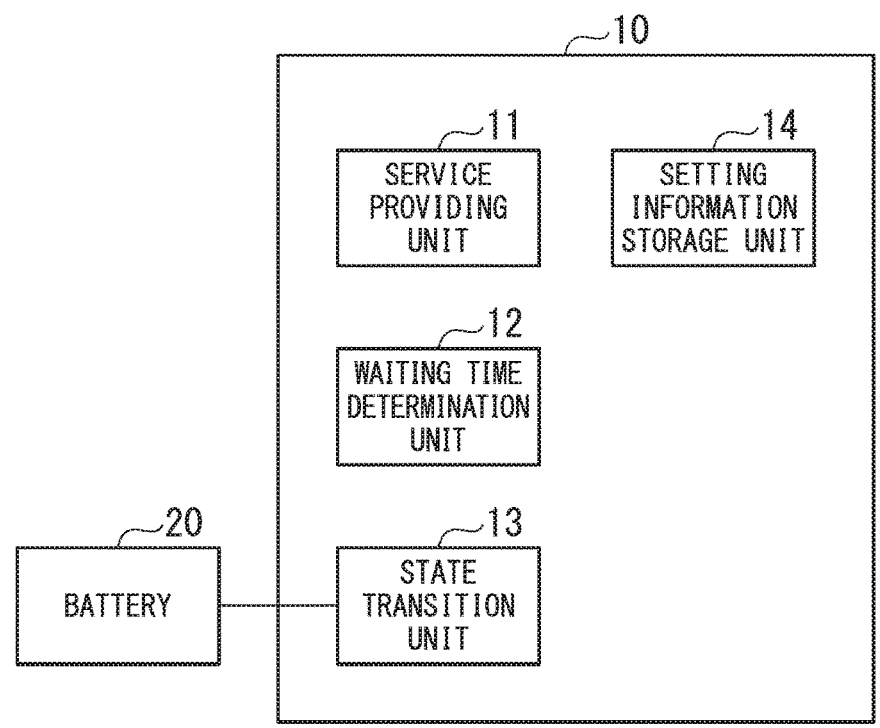
FIG. 2 is a block diagram showing a functional configuration of the vehicle-mounted device according to the first embodiment.

FIG. 2 is a block diagram showing a functional configuration of the vehicle-mounted device 10 according to the first embodiment. A functional configuration of the vehicle-mounted device 10 according to the first embodiment will be described using FIG. 2.

As shown in FIG. 2, the vehicle-mounted device 10 includes a service providing unit 11, a waiting time determination unit 12, a state transition unit 13, and a setting information storage unit 14.

The service providing unit 11 has a service providing function and is configured to provide a predetermined service to the user U. In the first embodiment, the service providing unit 11 of the vehicle-mounted device 10 is configured to provide a billing service as the predetermined service, and has a billing function for performing billing processing for the vehicle 1 positioned in a predetermined billing area as the service providing function. For example, the service providing unit 11 may be configured to specify the current position of the vehicle 1 on the basis of a signal received from a GPS satellite and calculate billing information in a case where the current position is in a predetermined billing area to perform billing processing.

The waiting time determination unit 12 is configured to determine a waiting time until the vehicle-mounted device 10 is shifted from a power-on state where a billing function is performed as a service providing function to a power saving state where the billing function is stopped when an engine of the vehicle 1 is stopped. Here, the "power-on state" of the vehicle-mounted device 10 is a "state where power is supplied from the battery 20 to the vehicle-mounted device 10 and a service providing function of the vehicle-mounted device 10 is performed."

In addition, the "power saving state" of the vehicle-mounted device 10 is a "state where a service providing function of the vehicle-mounted device 10 is stopped in order to reduce power consumed by the vehicle-mounted device 10 for the purpose of preventing the consumption of a remaining amount of charge of the battery 20." Accordingly, "power saving state" includes both "a power-off state where power to be supplied from the battery 20 to the vehicle-mounted device 10 is shut off" and "a state where power is supplied from the battery 20 to the vehicle-mounted device 10 for some functions (for example, a communication function and the like) among functions of the vehicle-mounted device 10, but power to be supplied from the battery 20 to the mounted device 10 is shut off for other functions."

In the first embodiment, the waiting time determination unit 12 randomly determines a waiting time. The "waiting time" is a "waiting time until the vehicle-mounted device 10 transitions from a power-on state to a power saving state when the engine of the vehicle 1 is stopped." As will be described later, the state transition unit 13 shifts the vehicle-mounted device 10 from a power-on state to a power saving state after a waiting tune has elapsed from the stopping of the engine of the vehicle 1.

In the first embodiment, a case where the range of a waiting time is previously specified as a predetermined range such as "a range from 5 minutes to 20 minutes (in units of seconds)," and the waiting time determination unit 12 randomly determines a waiting time from the predetermined range using a function for generating random numbers will be described, but a waiting time may be randomly determined in other ways. A predetermined range of a waiting time may be stored, for example, in the setting information storage unit 14 to be described later, and the waiting time determination unit 12 may acquire the predetermined range from the setting information storage unit 14 at the tame of determining a waiting time candidate to determine a waiting time.

The waiting time determination 12 is configured to overwrite a waiting time stored in the setting information age unit 14 to be described later with the determined waiting time to change a waiting time from a waiting time when the engine was stopped previously.

The state transition unit 13 as configured to shift the vehicle-mounted device 10 from a power-on state to a power saving state after a waiting time has elapsed from the stopping of the engine of the vehicle 1. The state transition unit 13 determines that the engine of the vehicle 1 has stopped at a timing when an ignition signal indicating that the engine is running which is input from an ignition circuit (not shown) has stopped to start to measure an elapsed time, and determines whether or not a waiting time has elapsed. The waiting time used for the determination may be acquired from the setting information storage unit 14 to be described later by the state transition unit 13. When the state transition unit 13 determines that a waiting time has elapsed, the state transition unit 13 shifts the vehicle-mounted device 10 from a power-on state to a power saving state by controlling power to be supplied from the battery 20 to each of the functions of the vehicle-mounted device 10.

The setting information storage unit 14 is configured to store the waiting time determined by the waiting time determination unit 12. In addition, the setting information storage unit 14 may store other information such as information required for the service providing unit 11 to provide a service to the user U.

(Processing Flow of Operations of Vehicle-Mounted Device According to First Embodiment)

Figure 3:
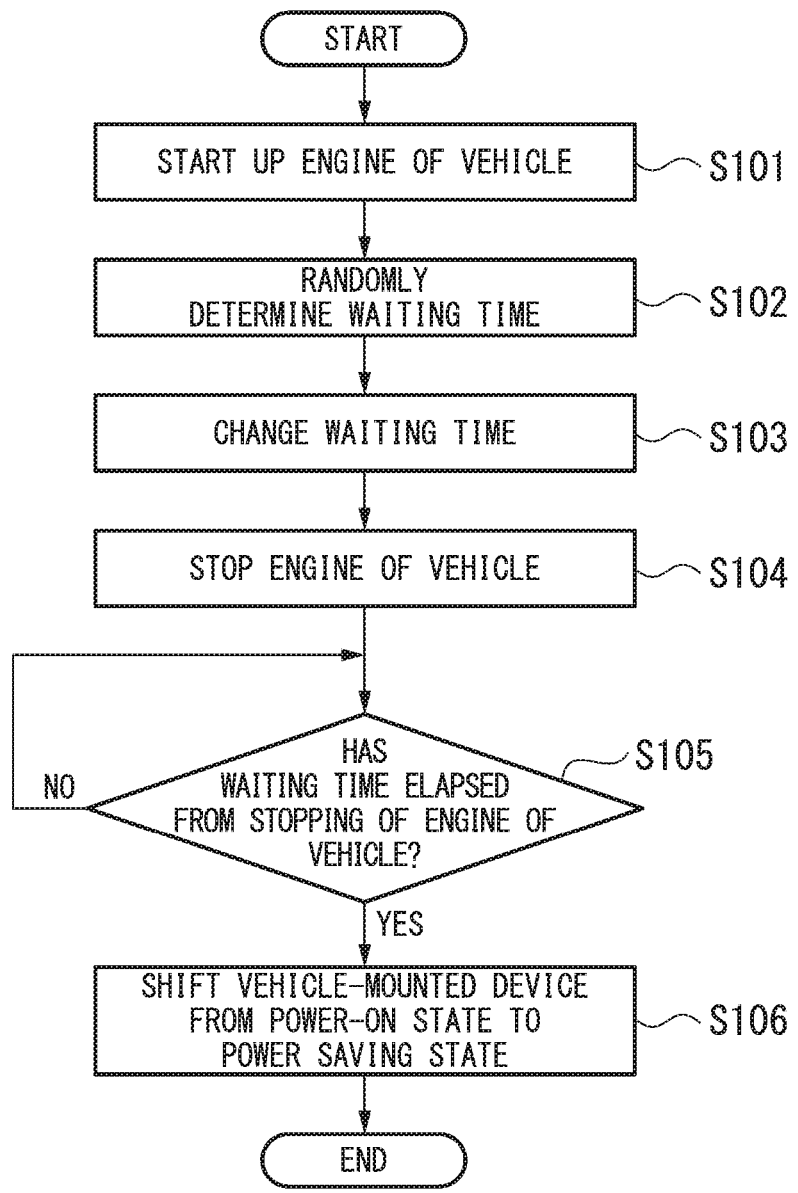
FIG. 3 is a flowchart showing operations of the vehicle-mounted device according to the first embodiment.

FIG. 3 is a flowchart showing operations of the vehicle-mounted device 10 according to the first embodiment. Operations of the vehicle-mounted device 10 according to the first embodiment will be described using FIG. 3.

As shown in FIG. 3, when the user U starts the engine of the vehicle 1 (step S101), the waiting time determination unit 12 randomly determines a waiting time (step S102). The waiting time determination unit 12 may determine that the engine of the vehicle 1 has been started at a timing when an ignition signal indicating that the engine has been started has been input from, for example, an ignition circuit (not shown) and may randomly determine a waiting time. Meanwhile, a timing when the waiting time determination unit 12 randomly determines a waiting time may be any of other timings as long as the timing is before the engine of the vehicle 1 is stopped.

For example, the waiting time determination unit 12 may predefine the range of a predetermined waiting time as "a range from 5 minutes to 20 minutes (in units of seconds)" and may randomly determine a waiting time from the range of the predetermined waiting time using a function for generating random numbers. In this case, for example, a waiting time is determined to be 14 minutes and 43 seconds.

The waiting time determination unit 12 overwrites a waiting time stored in the setting information storage unit 14 with the determined waiting time of 14 minutes and 43 seconds and changes the waiting time from a waiting time when the engine was stopped previously (step S103).

When the user U drives the vehicle 1 and stops the engine of the vehicle 1, for example, in the vicinity of a billing area (step S104), the state transition unit 13 determines whether or not a waiting time has elapsed from the stopping of the engine of the vehicle 1 (step S105). The state transition unit 13 may determine that the engine of the vehicle 1 has been stopped at a timing when an ignition signal input from, for example, an ignition circuit (not shown) has stopped, which indicates the stopping of the engine.

When the state transition unit 13 determines that the engine of the vehicle 1 has been stopped, the state transition unit starts to measure an elapsed time and acquires a waiting time stored in the setting information storage unit 14 with reference to the setting information storage unit 14. In a case where the state transition unit 13 determines that the measured elapsed time has not reached the acquired waiting time (NO in step S105), the state transition unit returns to step S105 to repeat the processing.

On the other hand, in a case where it is determined that a waiting time has elapsed from the stopping of the engine of the vehicle 1 (YES in step S105), the vehicle-mounted device 10 is shifted from a power-on state to a power saving state by controlling power to be supplied from the battery 20 to each of the functions of the vehicle-mounted device 10 (step S106). Thereby, the flow shown in FIG. 3 is terminated.

(Waiting Time of Vehicle-Mounted Device According to First Embodiment)

Figure 4:
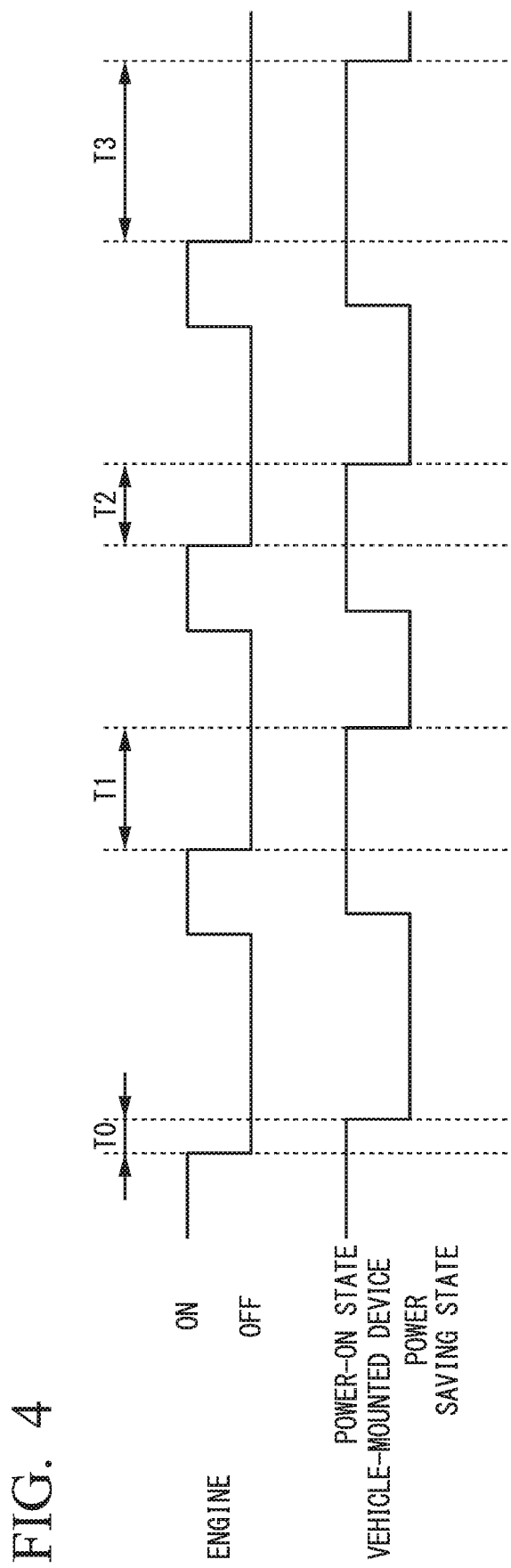
FIG. 4 is a diagram showing an example of a waiting time of the vehicle-mounted device according to the first embodiment.

FIG. 4 is a diagram showing an example of a waiting time of the vehicle-mounted device 10 according to the first embodiment. A waiting time of the vehicle-mounted device 10 in the first embodiment will be described using FIG. 4. In FIG. 4, a relationship between the state of the engine of the vehicle 1 and the state of the vehicle-mounted device 10 is shown in time series.

In the drawing shown in FIG. 4, time elapses from left to right. An upper portion in FIG. 4 shows the state of the engine of the vehicle 1 in two stages (an upper position and a lower position). The upper position indicates ON which is a state where the engine has been started, and the lower position indicates OFF which is a state where the engine has been stopped. A lower portion in FIG. 4 shows the state of the vehicle-mounted device 10 mounted in the vehicle 1 in two stages (an upper position and a lower position). The upper position indicates a power-on state of the vehicle-mounted device 10, and the lower position indicates a power saving state of the vehicle-mounted device 10.

In the case shown in FIG. 4, the engine of the vehicle 1 is stopped four times, and each of T0 to T3 indicates a waiting time until the vehicle-mounted device 10 transitions from a power-on state to a power saving state when the engine is stopped four times. As described above using the flow shown in FIG. 3, the waiting time determination unit 12 of the vehicle-mounted device 10 according to the first embodiment randomly determines a waiting time whenever the user U starts the engine, and changes the waiting time from a waiting time when the engine was stopped previously. Accordingly, in the case shown in FIG. 4, the waiting times T0 to T3 when the engine is stopped are different from each other.

(Operations and Effects)

As described above, the waiting time determination unit 12 included in the vehicle-mounted device 10 according to the first embodiment changes a waiting time from the waiting time when the engine was stopped previously.

In this manner, the vehicle-mounted device 10 according to the first embodiment can change a waiting time from a waiting time when the engine was stopped previously, and thus, for example, it becomes difficult for the user U of the vehicle 1 to ascertain the length of a waiting time by performing trial and error of repeatedly stopping and starting of an engine within a short period of time. Accordingly, it is possible to prevent the misuse of engine stopping for disabling a service providing function of the vehicle-mounted device 10 by the user U of the vehicle 1 intentionally stopping the engine of the vehicle 1 and starting the engine after waiting for the elapse of a waiting time. Here, "misuse of engine stopping" means "misuse of a sleep function of the vehicle-mounted device 10 due to engine stopping." The "sleep function" is a "function of shifting the vehicle-mounted device 10 from a power-on state to a power saving state (including a power-off state) where a service providing function is stopped after the engine of the vehicle 1 stopped, in order to prevent the exhaustion of a remaining amount of charge of the battery of the vehicle 1."

Further, the waiting time determination unit 12 randomly determines a waiting time.

Thereby, a waiting time is irregularly changed, and it becomes more difficult for the user U of the vehicle 1 to ascertain the length of the waiting time. Accordingly, it is possible to more effectively prevent the user U of the vehicle 1 from misusing engine stopping.

Second Embodiment

Figure 5:
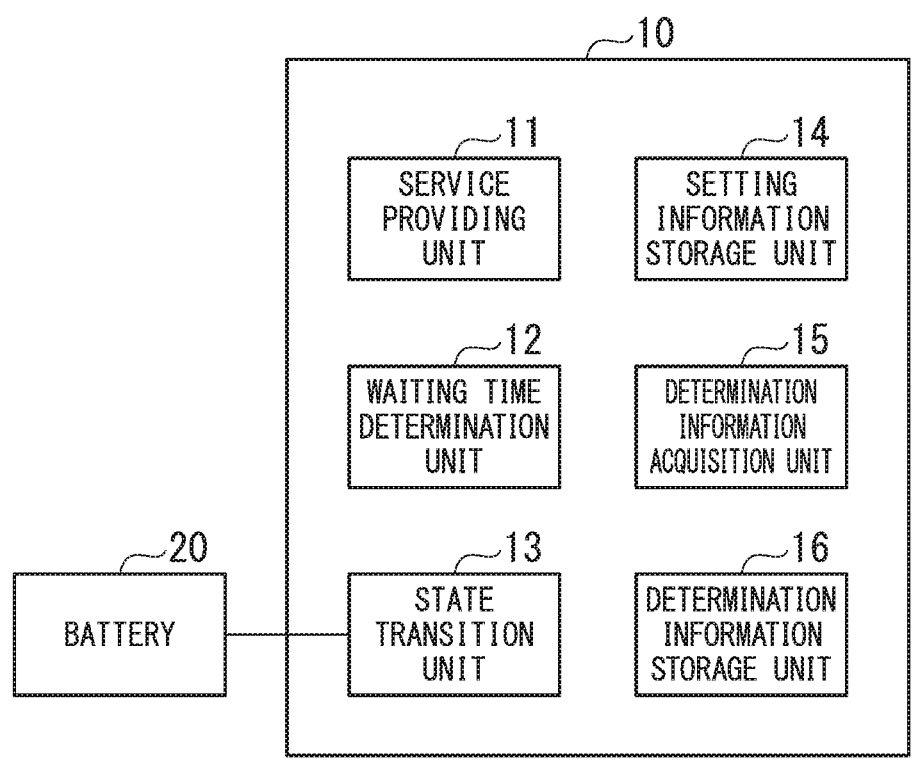
FIG. 5 is a block diagram showing a functional configuration of a vehicle-mounted device according to a second embodiment.
Figure 6:
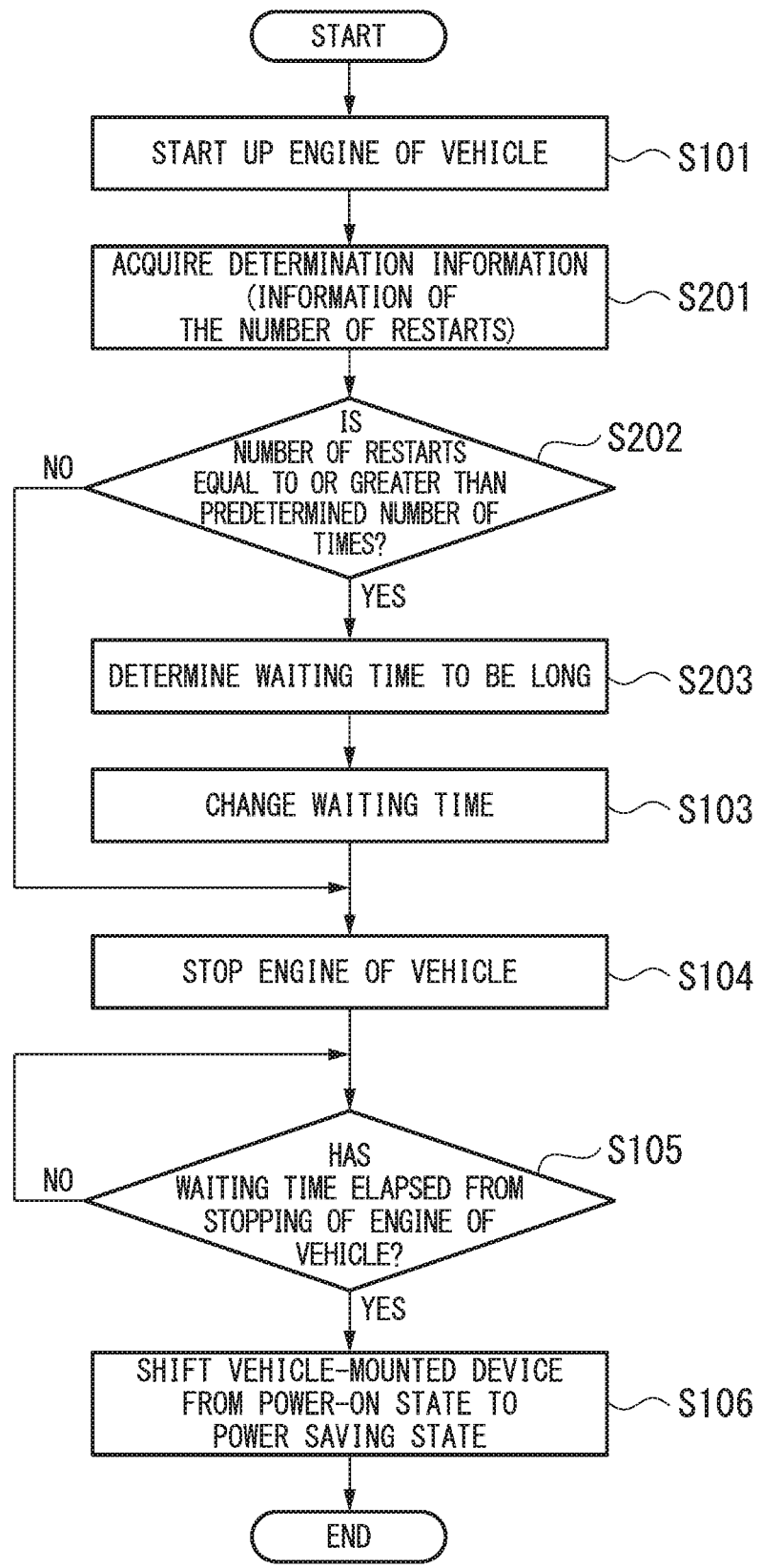
FIG. 6 is a flowchart showing operations of the vehicle-mounted device according to the second embodiment.

FIG. 5 is a block diagram showing a functional configuration of a vehicle-mounted device 10 according to a second embodiment. FIG. 6 is a flowchart showing operations of the vehicle-mounted device 10 according to the second embodiment. The vehicle-mounted device 10 according to the second embodiment will be described using FIGS. 5 and 6. Meanwhile, components included in the vehicle-mounted device 10 according to the second embodiment are configured and function in a similar manner to the components included in the vehicle-mounted device 10 according to the first embodiment except for a case where components are specially mentioned, and thus repeated description thereof will be omitted.

(Functional Configuration of Vehicle-Mounted Device According to Second Embodiment)

As shown is FIG. 5, the vehicle-mounted device 10 according to the second embodiment further includes a determination information acquisition unit 15 and a determination information storage unit 16.

The determination information acquisition unit 15 is configured to acquire determination information regarding a vehicle 1 of which the engine has been stopped. Here, the "determination information" means information regarding the vehicle 1 used for determination when the waiting time determination unit 12 determines a waiting time. In the second embodiment, a case where determination information is information regarding the number of restarts of the engine of the vehicle 1 within a predetermined determination time will be described, but the determination information include other information will be described later.

In the second embodiment, the determination information acquisition unit 15 acquires information regarding the number of restarts from the determination information storage unit 16 as determination information and inputs the acquired information to the waiting time determination unit 12.

The determination information storage unit 16 is configured to store determination information. In the second embodiment, the determination information storage unit 16 stores information regarding the number of restarts as determination information. Specifically, a time at which the engine has been started up (engine starting time) and a time at which the engine has been stopped (engine stopping time) may be stored in the determination information storage unit 16 as information regarding the number of restarts. For example, in a case where an ignition signal is input from an ignition circuit (not shown), the time may be stored in the determination information storage unit 16 as a time at which the engine has been started. Further, the input of an ignition signal from an ignition circuit (not shown) has been stopped, the time may be stored in the determination information storage unit 16 as a time at which the engine has been stopped.

(Processing Flow of Operations of Vehicle Mounted Device According to Second Embodiment)

A flowchart showing operations of the vehicle-mounted device 10 according to the second embodiment shown in FIG. 6 is different from the flowchart showing the operations of the vehicle-mounted device 10 according to the first embodiment shown in FIG. 3 in that the processes of steps S201 to S203 are performed instead of step S102.

As shown in FIG. 6, when the user U starts up the engine of the vehicle 1 (step S101), the determination information acquisition unit 15 acquires the number of restarts as determination information (step S201). For example, the determination information acquisition unit 15 counts pairs of engine starting times and engine stopping times which are continuous with each other for a predetermined determination time until the current time with reference to the determination information storage unit 16 and acquires the counted pairs as the number of restarts. Meanwhile, the determination information acquisition unit 15 may counts only one of engine starting times and engine stopping times for a predetermined determination time until the current time and acquire the counted time as the number of restarts.

Specifically, in a case where a predetermined determination time is one hour, the determination information acquisition unit 15 counts pairs of times of engine starting times and times of engine stopping times which are continuous with each other for one hour until the current time among the engine starting times and the engine stopping times stored in the determination information storage unit 16. Further, in a case where three pairs of engine starting times and engine stopping times are stored, the determination information acquisition unit 15 acquires the number of restarts as three times. Meanwhile, the predetermined determination time may be any time specified in advance. The determination information acquisition unit 15 inputs the acquired number of restarts to the waiting time determination unit 12.

Figure 7:
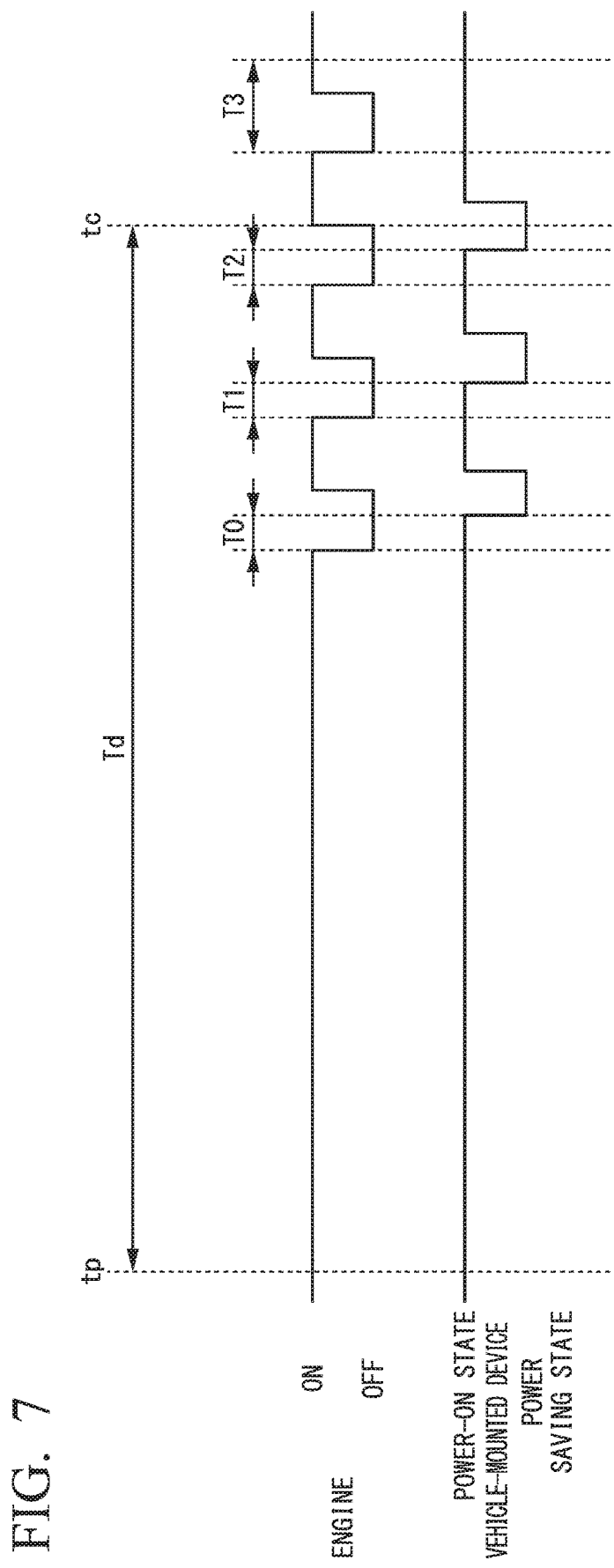
FIG. 7 is a diagram showing an example of a waiting time of the vehicle-mounted device according to the second embodiment.

The waiting time determination unit 12 determines whether or not the input number of restarts is equal to or greater than a predetermined number of times of determination (step S202). The predetermined number of times of determination may be specified in advance. For example, a case where the predetermined number of times of determination is three and the predetermined determination time is one hour will be described using FIG. 7. FIG. 7 is a diagram showing an example of a waiting time of the vehicle-mounted device 10 according to the second embodiment. Similarly to FIG. 4, a relationship between the state of the engine of the vehicle 1 and the state of the vehicle-mounted device 10 is shown in time series in FIG. 7.

In FIG. 7, tc represents a current time, and a time a predetermined determination time Td before the current time tc, that is, a time one hour before is represented by tp. In addition, similarly to FIG. 4, T0 to T3 represent waiting times until the vehicle-mounted device 10 transitions from a power-on state to a power saving state when the engine is stopped four times.

In the case shown in FIG. 7, engine starting and engine stopping which are continuous with each other are performed three times for one hour (predetermined determination time Td) from the time tp to the current time tc. Accordingly, the number of restarts which is input to the waiting time determination unit 12 is three. In this case, the waiting time determination unit 12 determines that the input number of restarts (three times in this example) is equal to or greater than a predetermined number of times of determination (three times in this example) (YES in step S202) and determines a waiting time T3 to become longer than a waiting time T2 when the engine was previously stopped (step S203). For example, a waiting time may be determined to become longer than a waiting time when the engine was previously stopped by a predetermined extended time determined in advance (for example, 5 minutes), and a waiting time may be extended in other ways.

The waiting time determination unit 12 overwrites a waiting time stored in the setting information storage unit 14 with the determined waiting time and changes the waiting time from the waiting time when the engine was previously stopped (step S103). After that, the processing proceeds in a similar manner to that in the flowchart in the case of the first embodiment shown in FIG. 3.

On the other hand, in a case where the waiting time determination unit 12 determines that the input number of restarts is not equal to or greater than the predetermined number of times of determination (NO in step S202), the processes of step S203 and S103 are not performed, and the processing proceeds to the process of step S104. That is, in a case where the waiting time determination unit 12 determines that the input number of restarts is not equal to or greater than the predetermined number of times of determination, the waiting time determination unit does not change a waiting time.

Meanwhile, in the second embodiment, the waiting time determination unit 12 may return a waiting time to the waiting time before the change after a predetermined application time has elapsed from the change of a waiting time to the waiting time determined to become longer. This can be performed, for example, by the waiting time determination unit 12 separately storing a waiting time before overwriting in the setting information storage unit 14 as a waiting time before the change at the time of overwriting a waiting time stored in the setting information storage unit 14 with the determined waiting time. Meanwhile, the predetermined application time may be specified in advance.

A case where the predetermined application time is, for example, one week will be described as an example. The waiting time determination unit 12 confirms a time of a waiting time finally stored in the setting information storage unit 14 with reference to the setting information storage unit 14 before the process of step S202 is performed, and overwrites the waiting time stored in the setting information storage unit 14 with the waiting time before the change which is separately stored in a case where a difference between the confirmed time and the current time is equal to or greater than one week. Thereby, the waiting time is returned to the waiting time before the change.

Meanwhile, in the above description, a case where a waiting time is returned to a waiting time before change after a predetermined application time has elapsed has been described. However, for example, the waiting time determination unit 12 may return a waiting time to a waiting time before change after a transition from the power-on state to the power saving state is performed by a predetermined number of times of application from a change to a waiting time determined to become longer. The predetermined number of times of application may be specified in advance.

(Operations and Effects)

As described above, the vehicle-mounted device 10 according to the second embodiment further includes a determination information acquisition unit 15 that acquires determination information regarding the vehicle 1 of which the engine has been stopped, and the waiting time determination unit 12 determines a waiting time on the basis of the determination information.

In this manner, the vehicle-mounted device 10 according to the second embodiment determines a waiting time on the basis of determination information regarding the vehicle 1 of which the engine has been stopped, and thus it is possible to more accurately determine whether or not the user U of the vehicle 1 has performed an operation for attempting to misuse engine stopping of the vehicle 1 from the determination information and change a waiting time in a case where there is a strong possibility that the user U of the vehicle 1 has performed the operation.

Further, the determination information includes information regarding the number of restarts of the engine of the vehicle 1 within a predetermined determination time, and the waiting time determination unit 12 determines a waiting time to become longer than a waiting time when the engine was previously stopped in a case where the number of restarts is equal to or greater than a predetermined number of times of determination.

Thereby, it is possible to prevent the misuse of engine stopping by increasing a waiting for a user U who intends to misuse engine stopping, for example, by repeating engine stopping and engine starting of the vehicle 1 in a short period of time and frequently performing engine stopping or engine starting. On the other hand, it is possible to avoid the consumption of a remaining amount of charge of a battery 20 without changing the length of a waiting time to become longer for a user U who repeats engine stopping and engine starting of the vehicle 1 accidentally.

Further, the waiting time determination unit 12 returns a waiting time to the waiting time before the change after a predetermined application time has elapsed from the change of a waiting time to the determined waiting time.

Thereby, it is possible to appropriately apply a countermeasure for changing a waiting time for only a predetermined application time requiring the countermeasure for preventing misuse and to more effectively prevent a user U of the vehicle 1 from misusing engine stopping. For example, in a case where even a user U who has intended to misuse engine stopping at the beginning but has not intended to misuse engine stopping thereafter, it is possible to cancel the countermeasure for increasing a waiting time. Further, in a case where a countermeasure for increasing a waiting time has been erroneously performed for a user U who has repeated engine stopping and engine starting of the vehicle 1 accidentally, it is possible to cancel the erroneous countermeasure after a predetermined application time has elapsed.

Further, the waiting time determination unit returns a waiting time to the waiting time before the change after a transition from a power-on state to a power saving state has been performed by a predetermined number of times of application from the change to the determined waiting time.

Thereby, it is possible to appropriately apply a countermeasure for changing a waiting time by only a predetermined number of times of application requiring the countermeasure for preventing misuse and to more effectively prevent a user U of the vehicle 1 from misusing engine stopping. For example, in a case where even a user U who has intended to misuse engine stopping at the beginning but has not intended to misuse engine stopping thereafter, it is possible to cancel the countermeasure for increasing a waiting time. Further, in a case where a countermeasure for increasing a waiting time has been erroneously performed for a user U who has repeated engine stopping and engine starting of the vehicle 1 accidentally, it is possible to cancel the erroneous countermeasure after a predetermined application time has elapsed. Further, the cancellation of a countermeasure is performed on the basis of the number of times, and it is possible to perform cancellation in a shorter period of time than in a case where the cancellation of a countermeasure is performed on the basis of a time.

<First Modification Example of Second Embodiment>

Figure 8:
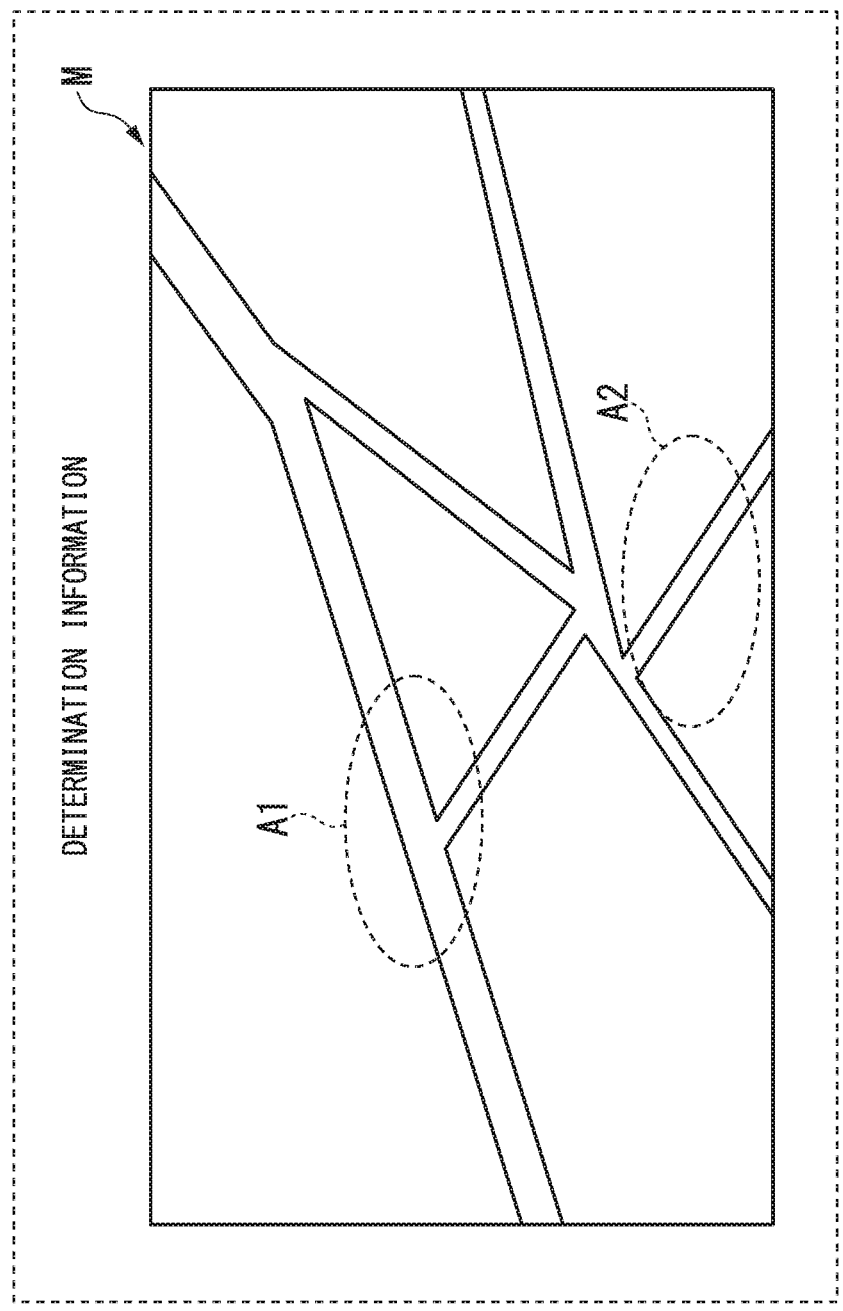
FIG. 8 is a first diagram showing an example of determination information according to a first modification example of the second embodiment.
Figure 10:
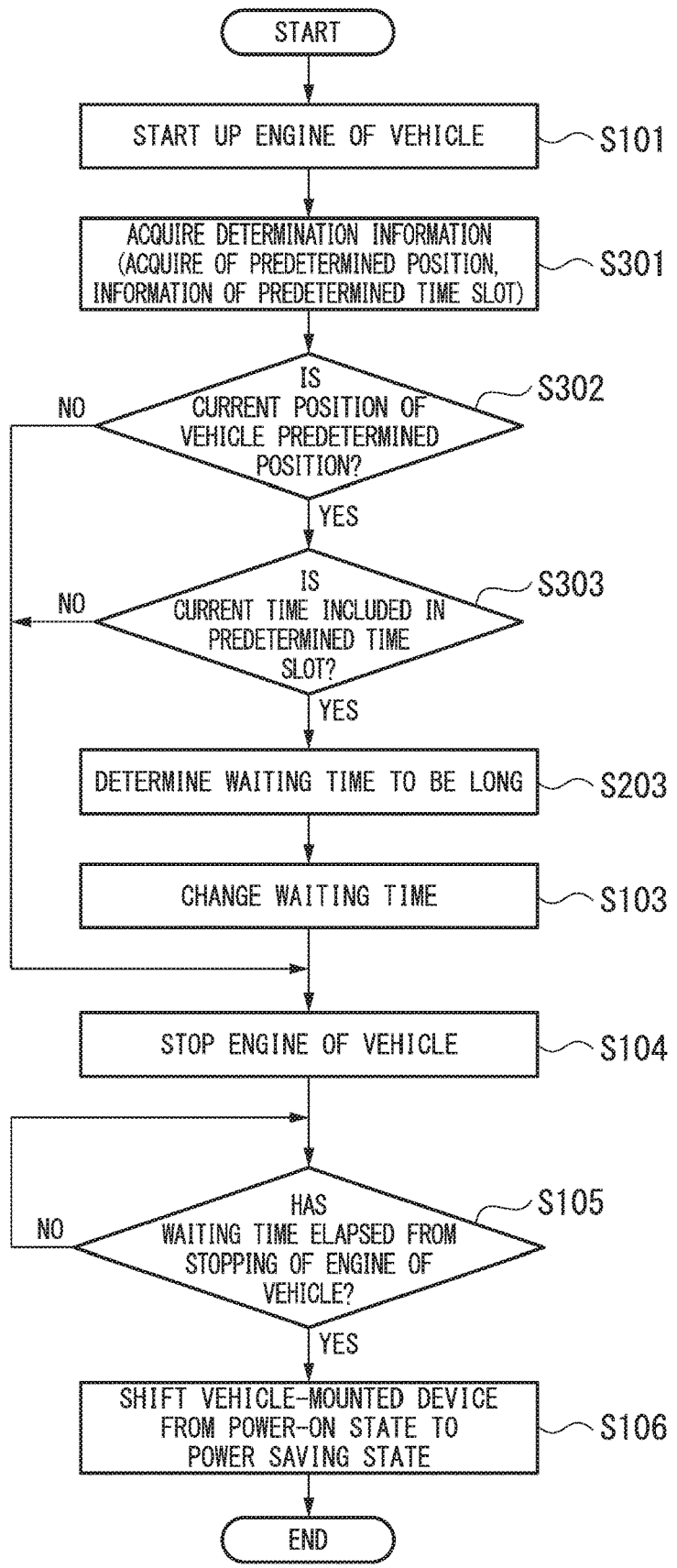
FIG. 10 is a flowchart showing operations of a vehicle-mounted device according to the first modification example of the second embodiment.

FIG. 8 is a first diagram showing an example of determination information according to a first modification example of the second embodiment. FIG. 9 is a second diagram showing an example of determination information according to the first modification example of the second embodiment. FIG. 10 is a flowchart showing operations of the vehicle-mounted device 10 according to the first modification example of the second embodiment. The vehicle-mounted device 10 according to the first modification example of the second embodiment will be described with reference to FIGS. 8 to 10. Meanwhile, components included in the vehicle-mounted device 10 according to the first modification example of the second embodiment are configured and function in a similar manner to the components included in the vehicle-mounted device 10 according to the second embodiment except for a case where the components are specially mentioned, and thus repeated description thereof will be omitted.

(Determination Information According to First Modification Example of Second Embodiment)

In the determination information storage unit 16 of the vehicle-mounted device 10 according to the first modification example of the second embodiment, billing map information shown in FIG. 8 and billing time slot information shown in FIG. 9 are stored in advance as determination information. The billing map information is information of a predetermined position and includes map information M which is information of a map on which the vehicle 1 travels and information of positions of billing areas (for example, A1, A2, . . . ) set in the map information M as shown in FIG. 8.

The billing time slot information is information on a predetermined time slot and is information in which billing areas set on the map information M are associated with a billing start time and a billing termination time, as shown in FIG. 9. For example, a first row of the determination information shown in FIG. 9 indicates that a toll is charged in a time slot "07:00:00 to 18:00:00" from a billing start time "07:00:00" to a billing termination time "18:00:00" for the vehicle 1 passing through a billing area A1. Meanwhile, the billing time slot information may include, for example, a day of billing, a period of billing (every day, every other day, or the like), and other information for each billing area.

In the first modification example of the second embodiment, the determination information acquisition unit 15 is configured to acquire information of a predetermined position (billing map information) and information of a predetermined time slot (billing time slot information) as determination information from the determination information storage unit 16 and input the acquired information to the waiting time determination unit 12.

(Processing Flow of Operations of Vehicle-Mounted Device According to First Modification Example of Second Embodiment)

A flowchart showing operations of the vehicle-mounted device 10 according to the second embodiment shown in FIG. 10 is different from the flowchart showing the operations of the vehicle-mounted device 10 according to the second embodiment shown in FIG. 6 in that the processes of steps S301 to S303 are performed instead of steps S201 and 202.

As shown in FIG. 10, when the user U starts up the engine of the vehicle 1 (step S101), the determination information acquisition unit 15 acquires information of a predetermined position (billing map information) and information of a predetermined time slot (billing time slot information) as determination information (step S301). The determination information acquisition unit 15 acquires billing map information and billing time slot information stored in the determination information storage unit 16 with reference to the determination information storage unit 16. The determination information acquisition unit 15 inputs the acquired billing map information and billing time slot information to the waiting time determination unit 12.

The waiting time determination unit 12 determines whether or not the current position of the vehicle 1 is a predetermined position included in the input billing map information (step S302). The current position of the vehicle 1 may be input to the waiting time determination unit 12 from the service providing unit 11 that can specify the current position of the vehicle 1 on the basis of, for example, signals received from a GPS satellite. In addition, a position acquisition unit configured to acquire the current position of the vehicle 1 may be separately provided so that the current position is input to the waiting time determination unit 12 from the position acquisition unit.

For example, in a case where the current position of the vehicle 1 is consistent with any one predetermined position (for example, a billing area A1) shown in FIG. 8, the waiting time determination unit 12 determines that the current position of the vehicle 1 is a predetermined position (YES in step S302), and the processing proceeds to the next step S303. On the other hand, in a case where the current position of the vehicle 1 is not consistent with any one predetermined position shown in FIG. 8, the waiting time determination unit 12 determines that the current position of the vehicle 1 is not a predetermined position (NO in step S302), the processes of steps S303, S203, and S103 are not performed, and the processing proceeds to the process of step S104. That is, in a case where the waiting time determination unit 12 determines that the current position of the vehicle 1 is not a predetermined position, a waiting time is not changed.

Next, the waiting time determination unit 12 determines whether or not a current time is included in a billing time slot (predetermined time slot) indicated by the input billing time slot information (step S303). For example, in a case where the current time is "10:00:00" and is included in "07:00:00 to 18:00:00" which is a billing time slot (predetermined time slot) for the billing area A1 as shown in FIG. 9, the waiting time determination unit 12 determines that the current time is included in the predetermined time slot (YES in step S303), and the processing proceeds to the next step S203. That is, similarly to the case in the second embodiment, the waiting time determination unit 12 determines a waiting time to become longer than a waiting time when the engine was previously stopped (step S203) and changes the waiting time from the waiting time when the engine was previously stopped (step S103). After that, the processing proceeds in a similar manner to that in the flowchart in the case of the second embodiment shown in FIG. 6.

On the other hand, for example, in a case where the current time is "19:00:00" and is not included in "07:00:00 to 18:00:00" which is a billing time slot (predetermined time slot) for the billing area A1, the waiting time determination unit 12 determines that the current time is not included in the predetermined time slot (NO in step S303), the processes of steps S203 and S103 are not performed, and the processing proceeds to the process of step S104. That is, in a case where the waiting time determination unit 12 determines that the current time is not included in the predetermined time slot, a waiting time is not changed.

(Operations and Effects)

As described above, in the vehicle-mounted device 10 according to the first modification example of the second embodiment, determination information includes information of a predetermined position, and the waiting time determination unit 12 determines a waiting time to become longer than a waiting time when the engine was previously stopped in a case where the current position of the vehicle 1 is a predetermined position.

In this manner, the vehicle-mounted device 10 according to the first modification example of the second embodiment determines a waiting time to be extended in a case where the current position of the vehicle 1 is a predetermined position and changes the waiting time, and thus it is possible to apply the change of a waiting time in a case where the current position of the vehicle 1 is a predetermined position requiring a countermeasure for preventing misuse and to more effectively prevent a user U of the vehicle 1 from misusing engine stopping. In particular, it is possible to change a waiting time only in a case where the vehicle 1 is positioned in a place, such as a billing area, where there is a high necessity to prevent the misuse of engine stopping of the vehicle 1. Accordingly, in a case where the vehicle 1 is positioned in a place, such as a place out of a billing area, where there is a low necessity to prevent the misuse of engine stopping of the vehicle 1, it is possible to avoid the consumption of a remaining amount of charge of the battery 20 without changing the length of a waiting time to become longer.

Further, in the vehicle-mounted device 10 according to the first modification example of the second embodiment, determination information includes information of a predetermined time slot, and waiting time determination unit 12 determines a waiting time to become longer than a waiting time when the engine was previously stopped in a case where a current time is included in the predetermined time slot.

In this manner, the vehicle-mounted device 10 according to the first modification example of the second embodiment determines a waiting time to be extended in a case where a current time is included in the predetermined time slot, and thus it is possible to apply the change of a waiting time in a case where the current position is included in the predetermined time slot requiring a countermeasure for preventing misuse and to more effectively prevent a user U of the vehicle 1 from misusing engine stopping. For example, it is possible to change a waiting time only in a time slot, such as a billing time slot, in which there is a high necessity to prevent the misuse of engine stopping of the vehicle 1. Accordingly, it is possible to avoid the consumption of a remaining amount of charge of the battery 20 without changing the length of a waiting time to become longer in a time slot, such as a time slot out of a billing time slot, in which there is a low necessity to prevent, the misuse of engine stopping of the vehicle 1.

According to the second embodiment and the first modification example of the second embodiment described above, a case where determination information includes information of the number of restarts, information of a predetermined position (charging map information), and information of a predetermined time slot (charging time slot information) has been described. However, the determination information is not limited to these pieces of information, and may be any information as long as it is information regarding the vehicle 1 which is used for determination when the waiting time determination unit 12 determines a waiting time.

For example, the determination information may include information of an acceleration and an angular velocity of the vehicle 1. The information of an acceleration and an angular velocity of the vehicle 1 is significantly effective in a case where the vehicle 1 is a motorcycle and can be used as information for determining whether or not the motorcycle remains stationary. For example, the vehicle-mounted device 10 may be provided with a measurement unit that measures an acceleration and an angular velocity of the vehicle 1, so that the determination information acquisition unit 15 is configured to acquire information of an acceleration and an angular velocity from the measurement unit and input the acquired information to the waiting time determination unit 12, and the waiting time determination unit 12 determines a waiting time on the basis of the acceleration and the angular velocity.

In this case, the waiting time determination unit 12 may determine a waiting time so that a waiting time does not elapse until a condition that the acceleration and the angular velocity of the vehicle 1 are continuously equal to or less than predetermined threshold values determined in advance for a predetermined period of time determined in advance is satisfied. This is because it is expected that an acceleration and an angular velocity are equal to or less than predetermined threshold values due to the body of the vehicle 1 such as a motorcycle remaining stationary in a case where the vehicle does not move in a state where the engine thereof is stopped. On the other hand, in a case where the vehicle 1 such as a motorcycle moves in a state where the engine thereof is stopped, it is assumed that an acceleration and an angular velocity are not equal to or less than predetermined threshold values due to the movement of the body of the vehicle. For example, the waiting time determination unit 12 may first determine and change a waiting time to be a significantly long waiting time and then give a transition instruction to the state transition unit 13 in a case where a condition that an acceleration and an angular velocity of the vehicle 1 are continuously equal to or less than predetermined threshold values for a predetermined period of time is satisfied. In this manner, it is possible to apply the change of a waiting time until an acceleration and an angular velocity of the vehicle 1 satisfy a predetermined condition indicating situation where a countermeasure for preventing misuse is not necessary and to more effectively prevent a user U of the vehicle 1 from using engine stopping. In particular, it is also possible to appropriately prevent the misuse of engine stopping for the vehicle 1 such as a motorcycle.

<Second Modification Example of Second Embodiment>

Figure 11:
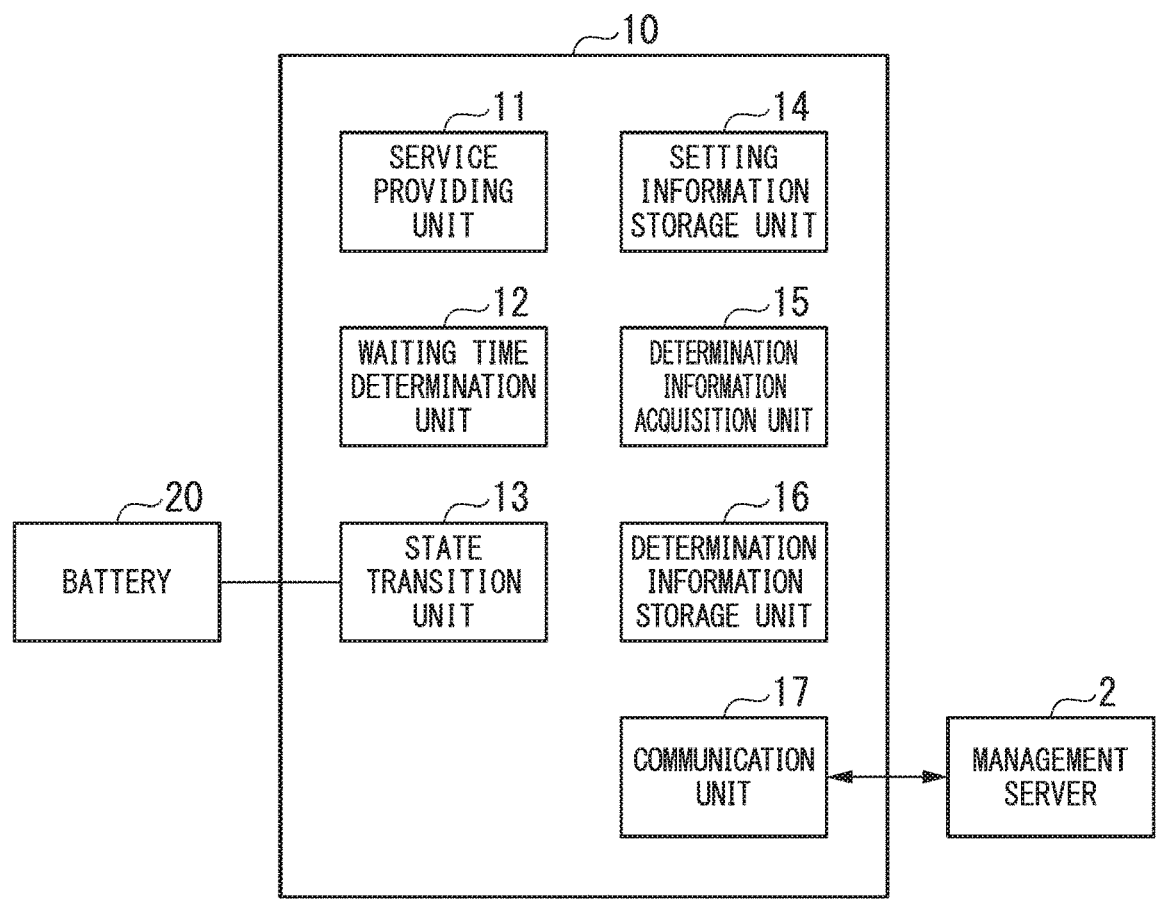
FIG. 11 is a block diagram showing a functional configuration of a vehicle-mounted device according to a second modification example of the second embodiment.

FIG. 11 is a block diagram showing a functional configuration of the vehicle-mounted device 10 according to a second modification example of the second embodiment. The vehicle-mounted device 10 according to the second modification example of the second embodiment will be described using FIG. 11. Meanwhile, components included in the vehicle-mounted device 10 according to the second modification example of the second embodiment are configured and function in a similar manner to the components included in the vehicle-mounted device 10 according to the second embodiment except for a case where the components are specially mentioned, and thus repeated description thereof will be omitted.

(Functional Configuration of Vehicle-Mounted Device According to Second Modification Example of Second Embodiment)

The vehicle-mounted device 10 according to the second modification example of the second embodiment further includes a communication unit 17 that can communicate with a management server 2 as shown in FIG. 11.

The management server 2 stores determination information such as information of a predetermined position (charging map information) and information of a predetermined time slot (charging time slot information). Further, the management server 2 may store information regarding a waiting time. The information regarding a waiting time may be, for example, a predetermined extended period or the like in a case where a waiting time is increased, the predetermined extended period being specified for each billing area shown in FIG. 9.

The determination information acquisition unit 15 according to the second modification example of the second embodiment communicates with the management server 2 through the communication unit 17 instead of referring to the determination information storage unit 16, acquires determination information such as information of a predetermined position (charging map information) and information of a predetermined time slot (charging time slot information) from the management server 2, and inputs the acquired information to the waiting time determination unit 12 in the process of step S301 in the flowchart according to the second modification example of the second embodiment shown in FIG. 10.

Meanwhile, the determination information acquisition unit 15 may acquire some of the determination information from the management server 2 and acquire other determination information from the determination information storage unit 16. Further, when the process of step S203 shown in FIG. 10 is performed, the waiting time determination unit 12 may acquire, for example, information regarding a waiting time to be determined from the management server 2 and may determine a waiting time on the basis of the acquired information regarding a waiting time.

(Operations and Effects)

As described above, in the vehicle-mounted device 10 according to the second modification example of the second embodiment, the determination information acquisition unit 15 acquires determination information from the management server 2.

In this manner, in the vehicle-mounted device 10 according to the second modification example of the second embodiment, the determination information acquisition unit 15 acquires determination information from the management server 2 positioned outside the vehicle-mounted device 10, and thus it is possible to determine a waiting time on the basis of the latest determination information updated by the management server 2. Thereby, it is possible to accurately ascertain conditions such as a place and a time in which and for which there is a high necessity to prevent the misuse of engine stopping of the vehicle 1 and to perform a countermeasure for changing a waiting time. Further, determination information is acquired from the management server 2, and thus it is possible to suppress the cost of the vehicle-mounted device 10 by reducing the amount of data stored in the determination information storage unit 16 of the vehicle-mounted device 10.

Figure 12:
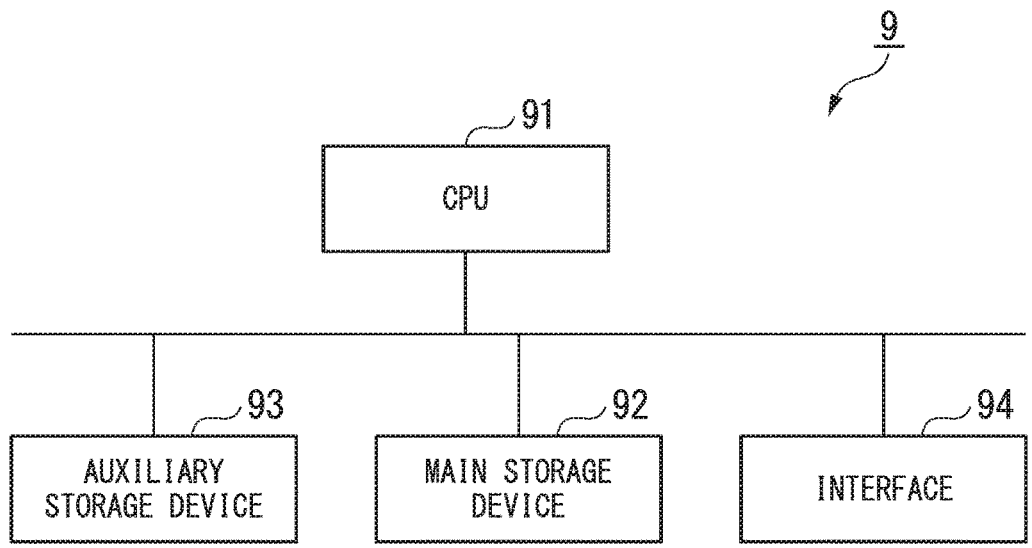
FIG. 12 is a schematic block diagram showing a configuration of a computer according to at least one embodiment.

FIG. 12 is a schematic block diagram showing a configuration of a computer according to at least one embodiment.

A computer 9 includes a CPU 91, a main storage device 92, an auxiliary storage device 93, and an interface 94.

The vehicle-mounted device 10 described above includes the computer 9. In addition, the operations of the above-described processing units are stored in the auxiliary storage device 93 in the format of programs. The CPU 91 reads out a program from the auxiliary storage device 93, loads the program to the main storage device 92, and executes the above-described processing in accordance with the program. For example, the service providing unit 11, the waiting time determination unit 12, the state transition unit 13, the determination information acquisition unit 15, and the communication unit 17 described above may be the CPU 91.

In addition, the CPU 91 secures a storage region corresponding to the above-described database in the main storage device 92 or the auxiliary storage device 93 in accordance with a program. For example, the setting information storage unit 14 and the determination information storage unit 16 of the vehicle-mounted device 10 described above may be secured in the auxiliary storage device 93.

Examples of the auxiliary storage device 93 includes a hard disk drive (HDD), a solid state drive (SSD), a magnetic disk, a magneto-optical disk, a compact disc read only memory (CD-ROM), a digital versatile disc read only memory (DVD-ROM), a semiconductor memory, and the like. The auxiliary storage device 93 may be an internal medium which is directly connected to a bus of the computer 9 or may be an external medium which is connected to the computer 9 through the interface 94 or a communication line. Further, in a case where this program is distributed to the computer 9 through a communication line, the computer 9 having received the program may load the program to the main storage device 92 and execute the above-described processing. In at least one embodiment, the auxiliary storage device 93 is a non-transitory tangible storage medium.

In addition, the program may be a program for implementing some of the above-described functions. Further, the program may be a so-called differential file (differential program) capable of implementing the above-described functions in combination with other programs stored in the auxiliary storage device 93 in advance.

Although some embodiments have been described above, those embodiments are described as examples, and do not intend to limit the scope of the invention. Those novel embodiments may be embodied in other various modes, and may be variously omitted, substituted, and modified without departing from the scope of the invention. Those embodiments and modification thereof are within the scope and the gist of the invention, and are within the scope of the invention described in the scope of claims and the equivalent thereof.

INDUSTRIAL APPLICABILITY

According to the vehicle-mounted device, the waiting time management method, and the waiting time management program described above, it is possible to change a waiting time until transition to a power saving state where a service providing function is stopped while the engine of a vehicle is stopped and to prevent misuse by a user of the vehicle.

REFERENCE SIGNS LIST

1 Vehicle
2 Management server
9 Computer
10 Vehicle-mounted device
11 Service providing unit
12 Waiting time determination unit
13 State transition unit
14 Setting information storage unit
15 Determination information acquisition unit
16 Determination information storage unit
17 Communication unit
20 Battery
91 CPU
92 Main storage device
93 Auxiliary storage device
94 Interface
M Map information
A1, A2 Billing area
T0 to T3 Waiting time
Td Predetermined determination time
tc, tp Time
U User

The invention claimed is:

1. A vehicle-mounted device comprising:
a processor; and
a non-transitory computer-readable medium having stored thereon executable instructions that, when executed by the processor, cause the vehicle-mounted device to function as:
  a waiting time determination unit, as part of the processor, which is configured to determine a waiting time until the vehicle-mounted device transitions from a power-on state where a service providing function is performed to a power saving state where the service providing function is stopped while an engine of a vehicle is stopped; and
  a state transition unit, as part of the processor, which is configured to shift the vehicle-mounted device from the power-on state to the power saving state after the waiting time has elapsed since stopping of the engine of the vehicle,
wherein the waiting time determination unit is configured to change the waiting time from a waiting time when the engine was stopped previous to this engine stop.

2. The vehicle-mounted device according to claim 1, wherein the waiting time determination unit is configured to randomly determine the waiting time.

3. The vehicle-mounted device according to claim 1, wherein the executable instructions, when executed by the processor, cause the vehicle-mounted device to further function as:

a determination information acquisition unit which is configured to acquire determination information regarding the vehicle of which the engine has been stopped,
wherein the waiting time determination unit is configured to determine the waiting time on the basis of the determination information.

4. The vehicle-mounted device according to claim 3, wherein
the determination information includes information of a number of restarts of the engine of the vehicle within a predetermined determination time, and
the waiting time determination unit is configured to determine the waiting time to become longer than the waiting time when the engine was stopped previous to this engine stop in a case where the number of restarts is equal to or greater than a predetermined number of times of determination.

5. The vehicle-mounted device according to claim 4, wherein the waiting time determination unit is configured to return the waiting time to a waiting time before a change to the determined waiting time after a predetermined application time has elapsed since the change.

6. The vehicle-mounted device according to claim 4, wherein the waiting time determination unit is configured to return the waiting time to a waiting time before a change to the determined waiting time after a transition from the power-on state to the power saving state has been performed a predetermined number of times of application after the change.

7. The vehicle-mounted device according to claim 3, wherein
the determination information includes information of a predetermined position, and
the waiting time determination unit is configured to determine the waiting time to become longer than the waiting time when the engine was stopped previous to this engine stop in a case where a current position of the vehicle is the predetermined position.

8. The vehicle-mounted device according to claim 3, wherein
the determination information includes information of a predetermined time slot, and
the waiting time determination unit is configured to determine the waiting time to become longer than the waiting time when the engine was stopped previous to this engine stop in a case where a current time is included in the predetermined time slot.

9. The vehicle-mounted device according to claim 3, wherein
the determination information includes information of an acceleration and an angular velocity of the vehicle, and
the waiting time determination unit is configured to determine the waiting time so that the waiting time does not elapse until a condition that the acceleration and the angular velocity are continuously equal to or less than predetermined threshold values for a predetermined period of time is satisfied.

10. A waiting time management method for a vehicle-mounted device comprising a processor, and a non-transitory computer-readable medium having stored thereon executable instructions that, when executed by the processor, cause the vehicle-mounted device to execute the steps of:
a waiting time determination step of determining a waiting time until a vehicle-mounted device transitions from a power-on state where a service providing function is performed to a power saving state where the service providing function is stopped while an engine of a vehicle is stopped; and a state shifting step of shifting the vehicle-mounted device from the power-on state to the power saving state after the waiting time has elapsed since stopping of the engine of the vehicle, wherein the waiting time determination step includes changing the waiting time from a waiting time when the engine was stopped previous to this engine stop.

11. A non-transitory computer-readable medium that stores a waiting time management program causing a computer of a vehicle-mounted device to function as:

a waiting time determination unit which is configured to determine a waiting time until the vehicle-mounted device transitions from a power-on state where a service providing function is performed to a power saving state where the service providing function is stopped while an engine of a vehicle is stopped; and a state transition unit which is configured to shift the vehicle-mounted device from the power-on state to the power saving state after the waiting time has elapsed since stopping of the engine of the vehicle, wherein the waiting time determination unit is configured to change the waiting time from a waiting time when the engine was stopped previous to this engine stop.

* * * * *